US012458874B2

(12) United States Patent
Routhier et al.

(10) Patent No.: US 12,458,874 B2
(45) **Date of Patent: *Nov. 4, 2025**

(54) INTERACTIVE GAME SYSTEM AND METHOD OF OPERATION FOR SAME

(71) Applicant: LÜ AIRE DE JEU INTERACTIVE INC., Québec (CA)

(72) Inventors: Vincent Routhier, Lévis (CA); Simon St-Hilaire, Québec (CA)

(73) Assignee: LÜ AIRE DE JEU INTERACTIVE INC., Québec (CA)

( * ) Notice: Subject to any disclaimer, the term of this patent is extended or adjusted under 35 U.S.C. 154(b) by 51 days.

This patent is subject to a terminal disclaimer.

(21) Appl. No.: 18/544,006

(22) Filed: Dec. 18, 2023

(65) Prior Publication Data

US 2024/0123339 A1 Apr. 18, 2024
US 2025/0135332 A2 May 1, 2025

Related U.S. Application Data

(63) Continuation of application No. 16/265,652, filed on Feb. 1, 2019, now Pat. No. 11,845,002.

(60) Provisional application No. 62/625,561, filed on Feb. 2, 2018.

(51) Int. Cl.

| | |
|---|---|
| ***A63F 9/24*** | (2006.01) |
| ***A63F 11/00*** | (2006.01) |
| ***A63F 13/213*** | (2014.01) |
| ***A63F 13/25*** | (2014.01) |
| ***A63F 13/537*** | (2014.01) |
| ***G06F 13/00*** | (2006.01) |
| ***G06F 17/00*** | (2019.01) |

(52) U.S. Cl.

CPC ............ *A63F 13/25* (2014.09); *A63F 13/213* (2014.09); *A63F 13/537* (2014.09)

(58) Field of Classification Search

CPC ... G07F 17/32; G07F 17/3211; G07F 17/3214
USPC ............................ 463/20, 22, 25, 36, 39, 42
See application file for complete search history.

(56) References Cited

U.S. PATENT DOCUMENTS

| | | | |
|---|---|---|---|
| 10,634,316 | B2 | 4/2020 | Engelen |
| 2014/0206432 | A1 | 7/2014 | Radek |
| 2016/0246039 | A1 | 8/2016 | Graf |
| 2017/0269712 | A1 | 9/2017 | Forsblom |
| 2017/0351415 | A1 | 12/2017 | Cheng |

(Continued)

*Primary Examiner* — Adetokunbo O Torimiro
(74) *Attorney, Agent, or Firm* — Merchant & Gould P.C.

(57) ABSTRACT

An interactive game system for implementing an interactive game in a room. The interactive game system includes a motion sensing module, a control unit, a projection module, and a lighting module. The motion sensing module senses movement of a real-world element and surface interaction data representative of a contact between the real-world element and an interactive surface is generated therefrom. The control unit generates graphic instructions and lighting instructions based on the surface interaction data, in accordance with an implementation of a gameplay of the interactive game. The projection module receives the graphic instructions from the control unit and projects graphics on the interactive surface in accordance therewith. The lighting module receives the lighting instructions from the control unit and performs illumination of a section of the room distinct from the interactive surface in accordance therewith.

19 Claims, 5 Drawing Sheets

(56) References Cited

U.S. PATENT DOCUMENTS

| | | | | |
|---|---|---|---|---|
| 2018/0117465 | A1* | 5/2018 | Voris | A63F 13/26 |
| 2018/0174347 | A1 | 6/2018 | Chaney | |
| 2018/0232471 | A1 | 8/2018 | Schissler | |
| 2019/0087049 | A1 | 3/2019 | Mani | |
| 2019/0244416 | A1 | 8/2019 | Tamaoki | |

* cited by examiner

INTERACTIVE GAME SYSTEM AND METHOD OF OPERATION FOR SAME

CROSS-REFERENCE TO RELATED APPLICATIONS

This application is a Continuation of U.S. application Ser. No. 16/265,652, filed on Feb. 1, 2019, which claims priority to U.S. Provisional Application No. 62/625,561 filed on Feb. 2, 2018, the disclosures of which is incorporated herein by reference in their entirety.

TECHNICAL FIELD OF THE INVENTION

The present invention relates to the field of interactive games. More particularly, it relates to an interactive game system which allows a room, or a large portion of a room, to be used as a setup for an interactive game, including at least one section of a wall being used as an interactive surface in the interactive game, and a method of operation for same.

BACKGROUND

There is known in the art touch display interactive game systems in which user interactions with a display device such as a screen (e.g. touch screen interactions) are being used as user inputs in the game played by the user (or group of users), with the output of the game being graphics being displayed on the display device and/or sound played on speakers.

There is also known in the art interactive game systems in which motion sensors detect the movements of a user (or a group of users) and use the detected movements as input in the game played by a user (or a group of users) with, once again, the output being graphics being displayed on the display device and/or sound played on speakers. For example, and without being limitative, the Kinect™ motion sensor is a motion sensing input device enabling a user (or a group of users) to control and/or interact with a game console, computer, or the like, using movements of the user (or group of users) as input rather than (or in combination with) other conventional input methods or devices such as, for example, a conventional game controller.

Known interactive game systems incorporating the above-described touch display detecting the user interaction with a display device or the motion sensor detecting the movement of the user (or group of users) and using the user interaction with the display device or the movements of the user (or group of users) as input in the game played by the user (or group of users) however commonly suffer from several drawbacks. For example, such game systems often offer limited immersivity, as the user interactions are limited to output being provided by a game engine through display of graphics on a display device and/or coordinated sound being played on speakers. Therefore, such systems are conventionally unsatisfactory for large scale interactive game systems which allow a room, or a large portion of a room, to be used as a setup for an interactive game, where additional outputs are required to provide an immersive user experience.

In view of the above, there is a need for an improved interactive game system and method of operation thereof which would be able to overcome, or at least minimize, some of the above-discussed prior art concerns.

SUMMARY OF THE INVENTION

In accordance with a first general aspect, there is provided an interactive game system for implementing an interactive game in a room of a building. The interactive game system comprises: a motion sensing module, a control unit in data communication with the motion sensing module, a projection module in data communication with the control unit and a lighting module in data communication with the control unit. The motion sensing module senses movement of a real-world element within a motion sensor field of view intersecting with an interactive surface including a plane extending substantially along at least a portion of a wall of the room of the building and surface interaction data representative of a contact between the real-world element and the interactive surface being are generated from the sensed movement of the real-world element. The control unit is configured to process the surface interaction data and to generate graphic instructions and lighting instructions, in accordance with an implementation of a gameplay of the interactive game. The projection module receives the graphic instructions from the control unit, with the graphic instructions being generated based on the processed surface interaction data. The projection module projects graphics on the interactive surface according to the graphic instructions received from the control unit. The lighting module receives the lighting instructions from the control unit and performs illumination of a section of the room distinct from the interactive surface, according to the lighting instruction received from the control unit.

In an embodiment, the lighting instructions are generated based on the surface interaction data and the graphics projected by the projection module and the lighting performed by the lighting module are coordinated in accordance with the implementation of the gameplay of the interactive game.

In an embodiment, the interactive game system further comprises a sound module in data communication with the control unit and receiving acoustic instructions therefrom, the sound module playing sounds according to the acoustic instructions received from the control unit.

In an embodiment, the acoustic instructions are generated based on the surface interaction data, the sounds played by the sound module and the graphics projected by the projection module being coordinated in accordance with the implementation of the gameplay of the interactive game.

In an embodiment, the lighting module comprises a plurality of stage lighting instruments operating independently to illuminate the desired section of the room.

In an embodiment, the lighting module comprises a DMX controller and the lighting module controls the plurality of stage lighting instruments using a DMX lighting control protocol.

In an embodiment, the plurality of stage lighting instruments includes a combination of moving light fixtures and static light fixtures.

In an embodiment, the control unit comprises a memory and a processor, with the control unit having a game engine stored in the memory and configured to implement a predetermined gameplay, based on user interactions defined by the surface interaction data, the game engine generating the graphic instructions and the lighting instructions.

In accordance with another general aspect, there is also provided an interactive game system for implementing an interactive game in a room having a wall and a floor. The interactive game system comprises: a motion sensing module, a control unit in data communication with the motion sensing module, a projection module in data communication with the control unit and a lighting module in data communication with the control unit. The motion sensing module includes at least one motion sensor having a motion sensor field of view intersecting with an interactive surface extending substantially along a section of the wall of the room. The at least one motion sensor acquires data relative to the motion of a real-world element within the motion sensor field of view. At least one of the motion sensing modules and the control unit generates surface interaction data representative of a contact between the real-world element and the interactive surface from the acquired data relative to the motion of the real-world element within the motion sensor field of view. The control unit comprises a memory and a processor and generates graphic instructions and lighting instructions based on the surface interaction data and in accordance with an implementation of the gameplay of the interactive game. The projection module receives the graphic instructions representing graphics to be displayed from the control unit. The projection module includes a projector projecting the graphics on the interactive surface, in accordance with the graphic instructions received from the control unit. The lighting module receives lighting instructions representing lighting to be performed from the control unit. The lighting module includes a plurality of stage lighting instruments and performs illumination of a section of the floor of the room, in accordance with the lighting instruction received from the control unit.

In an embodiment, the graphics projected by the projection module and the lighting performed by the lighting module are coordinated in accordance with the implementation of the gameplay of the interactive game.

In an embodiment, the interactive game system further comprises a sound module in data communication with the control unit, the control unit generating acoustic instructions and transmitting the acoustic instructions to the sound module and the sound module playing sounds according to the acoustic instructions received from the control unit.

In an embodiment, the acoustic instructions are generated based on the surface interaction data. The sounds played by the sound module and the graphics projected by the projection module are coordinated in accordance with the implementation of the gameplay of the interactive game.

In an embodiment, the plurality of stage lighting instruments are independently controllable using the lighting instructions to illuminate the desired section of the room.

In an embodiment, the lighting module comprises a DMX controller and the lighting module controls the plurality of stage lighting instruments using a DMX lighting control protocol.

In an embodiment, the plurality of stage lighting instruments includes a combination of moving light fixtures and static light fixtures.

In accordance with another general aspect, there is further provided a method for providing an interactive game in a room of a building, using an interactive game system. The method comprises the steps of: generating surface interaction data representative of a contact between a real-word element and an interactive surface defined along at least a portion of a wall of the room of the building; processing the surface interaction data in accordance with an implementation of a gameplay of the interactive game implemented using the interactive game system; generating graphic instructions relative to graphics to be projected on the interactive surface, based on the processed surface interaction data, and projecting the graphics on the interactive surface according to the graphic instructions; and generating lighting instructions based on the processed surface interaction data and performing lighting of a section of the room according to the lighting instructions, simultaneously with the projection of the graphics on the interactive surface.

In an embodiment, the method further comprises generating acoustic instructions based on the processed surface interaction data and playing sounds according to the acoustic instructions.

In an embodiment, the step of generating lighting instructions and performing the lighting includes projecting light according to an illumination span covering at least a portion of the room distinct from the interactive surface.

In an embodiment, the step of generating lighting instructions and performing the lighting includes independently controlling each stage lighting instrument of the lighting module in accordance with the lighting instructions.

In an embodiment, the step of generating surface interaction data representative of the contact between the real-world element and the interactive surface includes sensing movement of the real-world object within a motion sensor field of view intersecting with the interactive surface.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Although the embodiments of the interactive game system and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the interactive game system, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Moreover, although the associated method of operation of the interactive game system includes steps as explained and illustrated herein, not all of these steps are essential and thus should not be taken in their restrictive sense. It will be appreciated that the steps of the method described herein may be performed in the described order, or in any suitable order.

Figure 1:
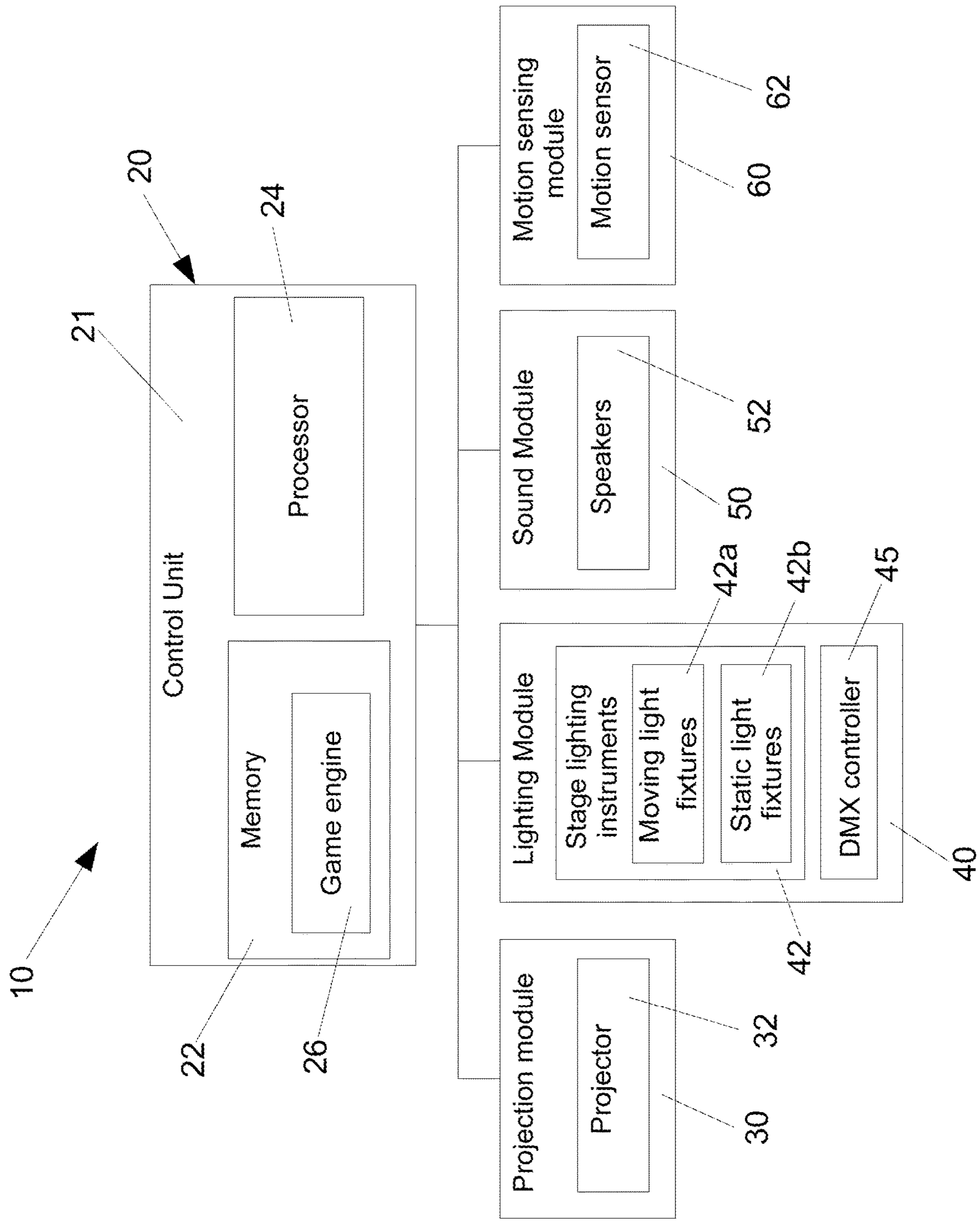
FIG. 1 is a schematic representation of the components of an interactive game system in accordance with an embodiment.
Figure 2:
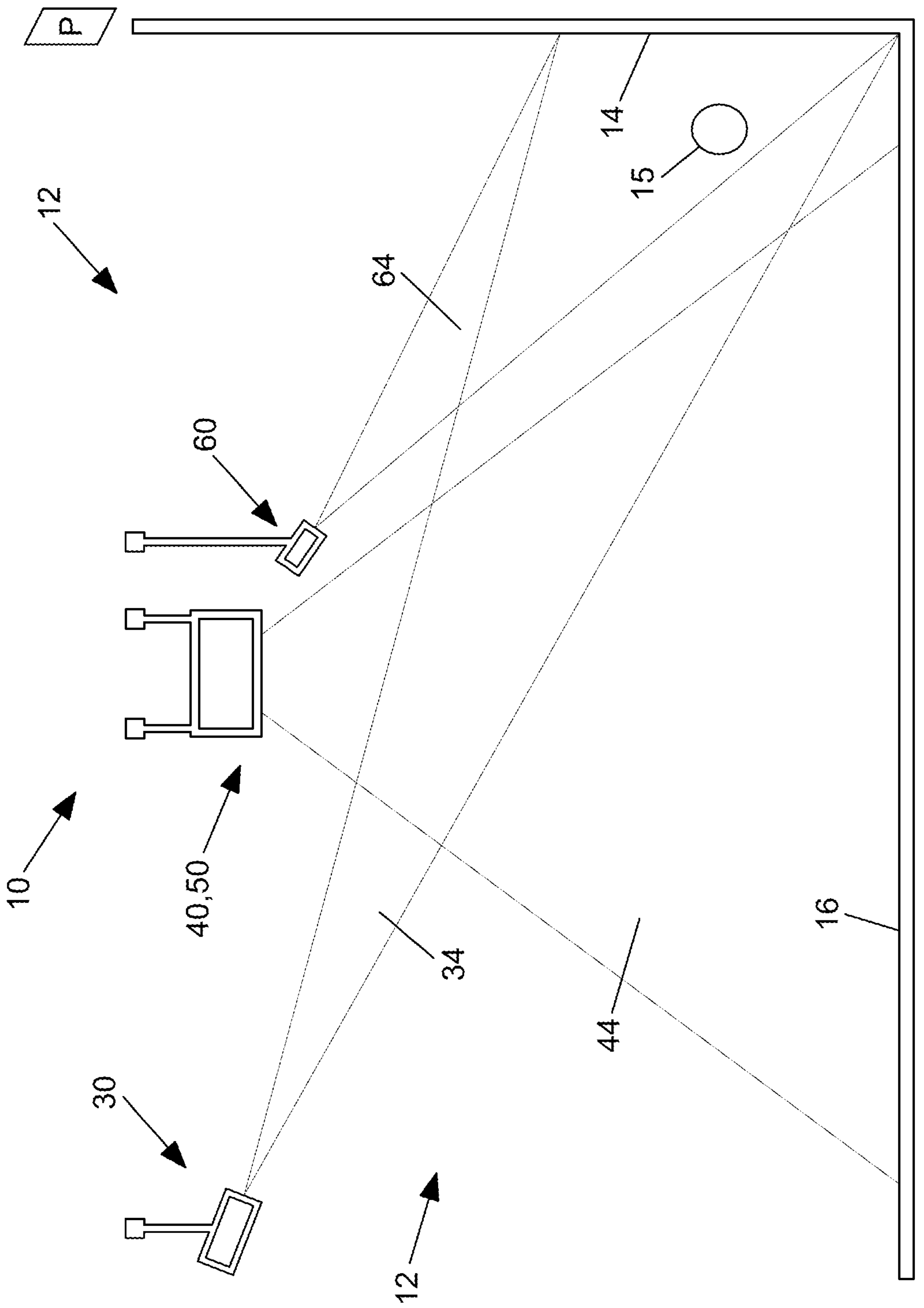
FIG. 2 is a schematic diagram of the interactive game system of FIG. 1 installed in a room of a building, in accordance with an embodiment where a single interactive surface is provided.

Referring generally to FIGS. 1 and 2, in accordance with one embodiment, there is provided an interactive game system 10. The interactive game system 10 is designed and configured to provide an interactive game experience in at least a section of a large room 12, using an interactive surface 14 (or interactive wall section). In an embodiment, the interactive surface 14 extends along a plane P defined by at least a portion of a wall 13 of the room 12 in which the interactive game system 10 is installed (or substantially parallel thereto). For example, and without being limitative, in an embodiment, the interactive game system 10 can be installed in a gymnasium of a school, a sport complex, or the like, to provide an interactive immersive and interactive playground for children positioned in the gymnasium, with at least a section of one wall 13 of the room 12 being used as the interactive surface 14 of the interactive game system 10. One skilled in the art will understand that, in alternative embodiments, the interactive game system 10, can also be installed in any other types of rooms having a sufficient dimension to provide the desired immersive experience such as, for example and without being limitative, a common room, a training room, a hall, etc. In an embodiment, the interactive surface 14 has dimensions ranging between about 12 inches by 7 inches and about 19 feet by 11 feet. In an alternative embodiment, the interactive surface 14 has dimensions ranging between about 8 feet by 4.5 feet and about 19 feet by 11 feet.

In the embodiment shown, the interactive game system 10 includes a control unit 20 (or controller), a projection module 30 (or projection source), a lighting module 40 (or light source), a sound module 50 (or acoustic source) and a motion sensing module 60 (or motion sensor). In an alternative embodiment, the interactive game system 10 could however be free of sound module 50.

In an embodiment, the control unit 20, the projection module 30, the lighting module 40, the sound module 50 and the motion sensing module 60 are mounted to a ceiling of the room 12 in which they are installed (i.e. are mounted to a structure positioned above a floor of the room 12, to ensure that they do not impede on the action of the users moving in the room 12). One skilled in the art will however understand that, in an alternative embodiment, at least one of the control unit 20, the projection module 30, the lighting module 40, the sound module 50 and the motion sensing module 60 could be positioned differently than the above-mentioned mounting to the ceiling of the room 12 in which they are installed. For example, and without being limitative, at least one of the control units 20 and the sound module 50 could be close to the ground, for example in a periphery of the room 12 to minimize the impact of the components with the actions of the users moving in the room 12 to play the interactive game. In another alternative embodiment, the at least one of the control unit 20, the projection module 30, the lighting module 40, the sound module 50 and the motion sensing module 60 could be included in a portative device temporarily installable (or positionable) in the room 12 to allow the interactive game system 10 to be temporally used for providing the immersive game experience in the room 12.

The projection module 30, lighting module 40, sound module 50 and motion sensing module 60 are connected to the control unit 20 (i.e. are in data communication with the control unit 20) to allow the control unit 20 to manage the operation thereof and provide the desired interactive and immersive game experience to the users in the room 12 through the inputs provided by the motion sensing module 60 and the outputs provided by the projection module 30, lighting module 40 and/or sound module 50.

One skilled in the art will understand that the data connection between the control unit 20 and each one of the projection modules 30, lighting module 40, sound module 50 and motion sensing module 60 can be any type of connection which allows data transfer therebetween. For example, and without being limitative, in an embodiment, the connection between the control unit 20 and the projection module 30, lighting module 40, sound module 50 and/or motion sensing module 60 is a wired connection. One skilled in the art will however understand that, in an alternative embodiment, the connection between the control unit 20 and the projection module 30, lighting module 40, sound module 50 and/or motion sensing module 60 can be a wireless connection, with the control unit 20 and the corresponding one the projection module 30, lighting module 40, sound module 50 and/or motion sensing module 60 being provided with communication hardware (e.g. receiver/transceiver) to allow wireless connection therebetween. For example, and without being limitative, the control unit 20 and the projection module 30, lighting module 40, sound module 50 and/or motion sensing module 60 could communicate over a local area network (LAN), a wide area network (WAN), such as the Internet, a wireless private area network (WPAN) or the like. One skilled in the art will also understand that other types of wireless communication could be used. One skilled in the art will also understand that different connections or connection types can be provided between the control unit 20 and each one of the projection modules 30, lighting module 40, sound module 50 and motion sensing module 60.

In the embodiment shown, the control unit 20 is a single (standalone) computing device 21 in data communication with the projection module 30, lighting module 40, sound module 50 and/or motion sensing module 60. The computing device 21 can include a memory 22 for storing instructions, data and the like and at least one processor 24 for processing data. One skilled in the art will understand that, in an alternative embodiment (not shown), the control unit 20 could include a combination of a central computing device, connected to remote computing device(s), such as server(s) or the like and communicating with one another over a network, such as, for example and without being limitative, a local area network (LAN), a wide area network (WAN), such as the Internet, or the like. In another alternative embodiment, the control unit 20 could be a remote computing device, communicating with the projection module 30, lighting module 40, sound module 50 and/or motion sensing module 60 over a network, such as, for example and without being limitative, a local area network (LAN), a wide area network (WAN), such as the Internet, a wireless private area network (WPAN) or the like.

Figure 1A:
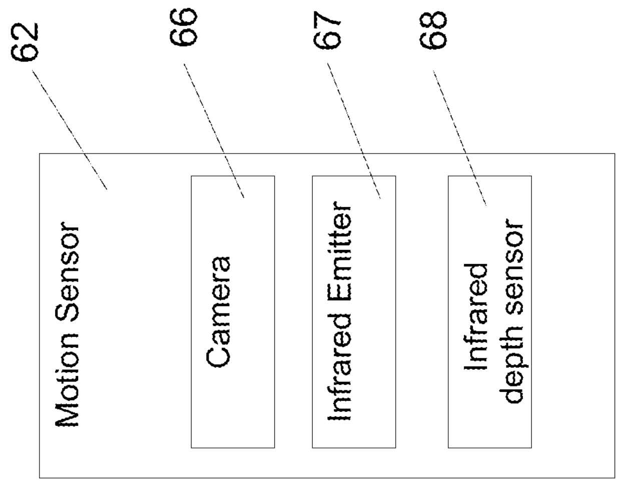
FIG. 1*a* is a schematic representation of the components of a motion sensor of the interactive game system of FIG. 1, in accordance with an embodiment.

In the embodiment shown in FIGS. 1, 1*a* and 2, the motion sensing module 60 includes at least one motion sensor 62 having a motion sensor field of view 64 intersecting with the interactive surface 14. The at least one motion sensor 62 is configured to sense motion of real-world elements 15 within the motion sensor field of view 64 in order to detect the occurrence and the position of a contact between each one of the real world elements 21 and the interactive surface 14 (i.e. detect when a real world element 21 intersects with the plane P defining the interactive surface 14 and detect the position of the real world element 21 within the interactive surface 14, when such contact occurs). In view of the above, in an embodiment, the data from the motion sensing module 60 can be used to generate surface interaction data representative of the contact between the real-word elements and the plane P defining the interactive surface 14. For example, and without being limitative, the surface interaction data can include data relative to the occurrence of a contact, the position (i.e. the coordinates) of the contact of the real-world element 15 on the interactive surface, etc.

In the course of the present document, the term "real-word element" is understood to refer to any real-world object, person, or the like, which can be located within the field of view of the motion sensing module 60, or can temporarily enter the field of view of the motion sensing module 60 and can contact (or intersect with) the interactive surface 14.

For example, and without being limitative, with reference to FIG. 1*a* in an embodiment, the motion sensing module 60 includes a Kinect™ motion sensor 62 having a camera 66, an infrared emitter 67 and an infrared depth sensor 68 cooperating to sense the movement of the real-world elements 15 within the motion sensor field of view 64. One skilled in the art will however understand that, in alternative embodiments (not shown), other form, type and/or model of motion sensor 62 could be used, such as sensor using time of Flight (ToF) technology, sensor using stereo technology, etc. Hence, the motion sensor 62 could include a different combination of components than the camera 66, infrared emitter 67 and infrared depth sensor 68 of the embodiment shown to acquire the data relative to the motion of the real-world elements 15 within the motion sensor field of view 64, which is required to generate the surface interaction data representative of the contact between the real-world elements 15 and the interactive surface 14.

In an embodiment, the motion sensing module 60 can also include any additional software, hardware (memory, processor, etc.), or combination thereof to generate the surface interaction data relative to a contact between real-world elements 15 and the interactive surface 14, from the data relative to real-world movement of the real-world elements 15 within the motion sensor field of view 64 thereof. One skilled in the art will however understand that, in an alternative embodiment, raw data relative to motion of the real-world element 15 within the field of view of the motion sensing module 60 could also be transferred to the control unit 20, with the control unit 20 including the software, hardware, or combination thereof to generate the surface interaction data relative to the contact between the real-world elements 15 and the interactive surface 14. In an embodiment, the motion sensing module 60 communicates the generated surface interaction data (or the raw data relative to motion of the real-world element 15 within the field of view of the motion sensing module 60) to the control module 20 in real-time. For the sake of clarity, in the following description, only reference to the embodiment where the surface interaction data is generated at the motion sensing module 60 and transferred to the control module 20 will be made, keeping in mind that alternatively, the surface interaction data can be generated at the control module 20, based on the data relative to motion of the real-world element 15 within the field of view of the motion sensing module 60 received therefrom.

In an embodiment, the motion sensing module 60 allows the generation of surface interaction data, without requiring any sensors being mounted on the corresponding wall 13 of the room 12. In other words, the motion sensing module 60 is positioned away from the wall 13 of the room 12 being used as interactive surface 14, with the motion sensor field of view 64 of the motion sensing module 60 being directed towards the wall 13 of the room 12 being used as interactive surface 14. The wall 13 used to define the interactive surface 14 can therefore simply be a conventional wall 13 of the room 12 which is being used for the interactive game. One skilled in the art will understand that, in an alternative embodiment, at least a section of the floor, the ceiling or any other element located in the room 12 could also be used to define the interactive surface 14. In the course of the present description, the term "wall" will however be used when referring to the structure used to define the interactive surface 14, in order to ease description.

In order to allow the capture of precise data by the motion sensing module 60 (and consequently generation of precise corresponding surface interaction data), in an embodiment, the motion sensing module 60 is initially calibrated to define the spatial position of the surface defining the interactive surface 14. In an embodiment, the calibration defines the plane P (i.e. the flat surface corresponding to the desired surface) along which contact with an element of the physical world is to be detected. It will be understood that to perform the calibration of the motion sensing module 60, the dimensions of the interactive surface 14 must previously be defined. In other words, in an embodiment. the motion sensing module 60 is calibrated to define a plane P corresponding to the plane extending between the previously defined coordinates (i.e. x, y and z positions) of the corners of the interactive surface 14. In view of the above, it will be understood that in most cases, the interactive surface 14 will substantially match the surface of a corresponding section of a wall 13 of the room 12 that is used to define the interactive surface 14. However, in cases where, for example and without being limitative, the surface of the wall 13 is uneven, or where the coordinates (i.e. x, y and z positions) of the corner of the interactive surface 14 are not positioned along a common wall surface, the interactive surface 14 (i.e. the plane P defined between the corners of the interactive surface 14) could differ from the surface of the corresponding wall 13.

In an alternative embodiment, the motion sensing module 60 could be calibrated to match the interactive surface 14 exactly with the surface of the corresponding wall (or section thereof), rather than by defining a plane common to the predefined corners of the interactive surface 14.

For example, and without being limitative, in an embodiment, the motion sensing module 60 can be configured to detect contacts between balls and the interactive surface 14 (i.e. the motion sensing module 60 is configured to capture the exact position of contact of each one of the balls with the interactive surface 14). One skilled in the art will understand that, in an alternative embodiment, interactions between the physical world and the interactive surface 14, different from the above-mentioned ball contact, could also be detected by the motion sensing module 60 (e.g. a user touching the interactive surface 14, a contact between an object different from a ball and the interactive surface 14, etc.), with the generated surface interaction data being subsequently transferred from the motion sensing module 60 to the control unit 20.

As will be described in more details below, the control unit 20 can receive the surface interaction data as user input from the user within the interactive game and perform processing of the surface interaction data to subsequently control the projection module 30, lighting module 40 and sound module 50 to implement the gameplay of the interactive game in accordance with the surface interaction data received as user input from the motion sensing module 60 (i.e. to generate the data relative to the graphics, lighting and sound to be outputted to the user to allow subsequent user interaction and representing the evolution of the user in the game being played in accordance with the game plot). In the course of the present application, the term "gameplay" is used to refer to the way the game is played and includes the game plot defined by the evolutive sequence of action defining the interactive game and which the player goes through in the game, as the action of the game evolves. Hence, in the present application, the implementation of the "gameplay" encompasses the determination of the specific graphics, lighting and/or sound to be outputted in accordance with the game plot to provide the desired immersive and interactive experience to the players.

The control unit 20 is configured to control at least one of the projection module 30, the lighting module 40 and the sound module 50 in real-time, based on the surface interaction data (i.e. based on the input data from the motion sensing module 60 relative to real-world elements 15 contacting the interactive surface 14), in order to provide an interactive game experience.

In an embodiment, the control unit 20 runs a game engine 26 configured to implement a predetermined gameplay, based on user interactions (or user inputs) as defined by the surface interaction data input and output the data relative to the corresponding graphics, lighting and/or sound. The game engine 26 is stored in the memory 22 of the control unit 20 and includes the necessary components to generate the required output instructions for implementing the gameplay (or game logic) (e.g. the graphic display, lighting, sound, etc. required to allow the user to interact and play the game). In an embodiment, the game engine includes, for example and without being limitative, a main game engine implementing the gameplay instructions, a rendering engine generating the required graphic instructions, an audio engine generating the required audio instructions, a lighting engine generating the required lighting instructions, a physics engine, etc. In other words, the game engine generates graphic instructions, lighting instructions and/or acoustic instructions, for the control unit 20 to control the output of the projection module 30, the lighting module 40 and/or the sound module 50 respectively, in accordance with the implementation of the gameplay of an interactive game. One skilled in the art will understand that, in an embodiment, several different interactive games could be played using the interactive game system 10, each interactive game having its own gameplay parameters. In an embodiment, the control unit 20 could access a database including gameplay information regarding the corresponding interactive game.

In an embodiment, the control unit 20 receives the surface interaction data from the motion sensing module 60 in real-time and generates and transmits output instructions to control at least one of the projection module 30, the lighting module 40 and the sound module 50 also in real-time. As mentioned above, in an alternative embodiment, the control unit 20 could also receive raw data relative to real-world movement within the motion sensor field of view 64, with the control unit 20 processing the data to generate the surface interaction data relative to contact between the real-world element 15 and the interactive surface 14 and subsequently generating and transmitting output instructions to control at least one of the projection module 30, the lighting module 40 and the sound module 50 in real-time in order to provide the desired interactive experience to the user.

In view of the above, in an embodiment, the control unit 20 generates graphic instructions as output to be transmitted to the projection module 30 to project graphics (i.e. 2D or 3D graphics) on the interactive surface 14. In an embodiment, the projection module 30 includes a projector 32 having a projector field of view 34 intersecting with the interactive surface 14, to display the desired graphics on the interactive surface 14. One skilled in the art will understand that, in an alternative embodiment, the control unit 20 could include more than one projector 32 or other display devices controlled by the control unit 20 and capable of displaying graphics on the interactive surface 14. As mentioned above, the graphic instructions relative to the graphics to be displayed by the projection module 30 result from the processing of the surface interaction data generated using the motion sensing module 60, thereby producing an interactive graphic display for the users. In other words, the graphic instructions are generated based on the surface interaction data, such that the graphic instructions are dependent of the real-world element 15 contacting the interactive surface 14, thereby providing the interactivity between the real-world actions and providing the evolution of the interactive game.

In an embodiment, the projection module 30 is also calibrated, according to the predetermined interactive surface 14, in order to provide a precise clear and graphic display. A calibration similar to the above-described calibration of the motion sensing module 60, to define the spatial position of the surface defining the interactive surface 14, can therefore be performed for the projection module 30. Hence, a method similar to the one described above for the motion sensing module 60 can be performed. For example, and without being limitative, in an embodiment, the calibration defines the plane P (i.e. the flat surface corresponding to the desired surface) onto which the graphics are to be displayed. It will be understood that to perform the calibration of the projection module 30, the dimension of the interactive surface 14 must previously be defined such that the projection module 30 is calibrated to define a plane P corresponding to the plane extending between the previously defined coordinates (i.e. x, y and z positions) of the corners of the interactive surface 14. In view of the above, it will once again be understood that in most cases, the interactive surface 14 onto which the graphics are to be displayed will substantially match the surface of a corresponding section of a wall 13 of the room 12 that is used to define the interactive surface 14. In an embodiment, a color calibration of the projection module 30 can also be performed for the specific conditions of the room 12 in which the interactive game system 10 is installed.

In an embodiment, the control unit 20 also generates lighting instructions as output to be transmitted to the lighting module 40, to illuminate the room 12 in which the interactive game is played. The lighting module 40 has an illumination span 44 which can cover at least a portion of the room 12, but which does not overlap with the interactive surface 14, in order not to substantially impede on the quality and contrast of the graphics projected by the projection module 30 on the interactive surface 14. For example and without being limitative, in an embodiment where the interactive surface 14 extends along a surface of a wall 13 of the room 12, the illumination span 44 of the lighting module 40 is limited to illumination of the floor 16 of the room 12, in order to minimize the negative incidence of the lighting provided by the lighting module 40 on the graphics projected by the projection module 30 on the interactive surface 14.

In an embodiment, the lighting module 40 includes a plurality of stage lighting instruments 42 (or stage lighting fixtures) operating simultaneously and used in combination to illuminate the desired section of the room 12 in which the interactive game is played, in accordance with the lighting instructions. For example, and without being limitative, in an embodiment, the lighting module 40 comprises between about six and twenty stage lighting instruments 42. In an embodiment, the lighting module 40 comprises about eight LED stage lighting instruments 42 of 180W each to illuminate a section of about thirty feet by thirty feet and about sixteen LED stage lighting instruments 42 of 180W to illuminate a section of about sixty feet by thirty feet. In view of the above, it will be understood that the quantity of stage lighting instruments 42 depends on the size of the section of the room 12 to be illuminated by the lighting module 40 and that, therefore, in alternative embodiments, a quantity of stage lighting instruments 42 different from the above-mentioned embodiment could be provided, for example to light a larger section or smaller section of a room 12 than the above described embodiments.

In an embodiment, the plurality of stage lighting instruments 42 includes a combination of moving light fixtures 42*a* and static light fixtures 42*b* cooperating to provide the lighting of the corresponding section of the room 12. For example, and without being limitative, in an embodiment where the lighting module 40 comprises about eight stage lighting instruments 42, the lighting module 40 can include two moving light fixtures 42*a* and six static light fixtures 42*b* and in an embodiment where the lighting module 40 comprises about sixteen stage lighting instruments 42, the lighting module 40 can be four moving light fixtures 42*a* and twelve static light fixtures 42*b*.

In an embodiment each one of the stage lighting instruments 42 of the lighting module 40 is independently controllable in accordance with the output lighting instructions produced by the control unit 20 (i.e. the type, color, intensity, direction etc. of a light beam produced by each stage lighting instrument 42 of the lighting module 40 can be controlled independently). In other words, the lighting instructions produced by the control unit 20 can relate to the lighting to be produced by each one of the stage lighting instruments 42 of the lighting module 40 independently. In the case of the moving light fixtures 42*a*, the movement of the light beam produced by the stage lighting instrument 42 can also be independently controlled, for example to provide moving light, follow-spots, additional light for a precise portion of the section being of the room being lighted, etc. Such moving light fixtures 42*a* thereby contribute to an enhanced luminous atmosphere provided by the lighting module 40 for the interactive game.

The independent control of the plurality of stage lighting instruments 42 can therefore be used to vary the colors and/or intensity of the lighting and/or display animated lighting sequences including, for example and without being limitative, targeted color change, lighting of specific zones, punctual lighting effects, etc., which highly enhance the immersive experience of the interactive game, in the room 12.

In an embodiment, to provide such individual control of the plurality of stage lighting instruments 42, the lighting module 40 uses DMX (e.g. DMX 512) as the lighting control protocol. In such an embodiment, each one of the stage lighting instruments 42 has a DMX address and are interlinked to each other and to the control unit 20 using DMX cables. In an embodiment, the lighting module 40 comprises a DMX controller 45 and the game engine 26 of the control unit 20 includes a software interface which supports communication with the DMX controller 45. For example, and without being limitative, in an embodiment, the DMX controller 45 is a DMX USB PRO controller from ENTTEC. In an embodiment, the DMX controller 45 is operative to receive the output lighting instructions from the control unit 20 (i.e. from the game engine 26 of the control unit 10) and translate the lighting instructions into DMX instructions, for independently controlling of the plurality of stage lighting instruments 42 of the lighting module 40.

One skilled in the art will however understand that, in an alternative embodiment, other lighting control protocol allowing control of each one of the stage lighting instruments 42 can be used.

In an embodiment, the illumination provided by the lighting module 40, according to the lighting instructions generated by the control unit 20, results from processing of the surface interaction data generated using the motion sensing module 60, thereby producing an interactive illumination for the users. In other words, the lighting instructions are generated based on processing of the surface interaction data, such that the lighting instructions are dependent on the real-world events related to the real-world elements 15 contacting the interactive surface 14, thereby providing the interactivity between the real-world actions and the illumination provided by the lighting module 40.

In view of the above, in an embodiment, the control unit 20 synchronizes the graphics projected by the projection module 30 and the illumination provided by the lighting module 40 to provide an immersive experience where the graphics and the illumination are complementary and coordinated in accordance with the implementation of the gameplay of the interactive game, as the game progresses. In an embodiment, the lighting module 40 could also include additional components (e.g. laser, fog machines, etc.) used to provide special effects which are performed according to the implementation of the gameplay and complement the above-mentioned graphics and/or illumination.

In an alternative embodiment, the illumination provided by the lighting module 40, according to the lighting instructions generated by the control unit 20, could be independent from the surface interaction data generated using the motion sensing module 60, i.e. the lighting instructions generated by the control unit 20 could be predetermined and be independent from the interactions of the real-world element 15 with the interactive surface 14. In such an embodiment, there is therefore no sync between the graphics projected by the projection module 30 (according to the graphic instructions output generated by the control unit 20) and the illumination provided by the lighting module 40 (according to the lighting instructions output generated by the control unit 20), while still providing an immersive experience where graphics and illumination are provided in an interactive game played by users in a large room 12.

As mentioned above, one skilled in the art will understand that the lighting instructions could relate to the type, color, intensity, etc. of the lighting to be emitted by the lighting module 40, as well as to a specific direction for each moving light fixture 42*a* (i.e. the lighting instructions could relate to a type, color, intensity, direction etc. of a light beam for the illumination provided by each stage lighting instrument 42 of the lighting module 40).

In an embodiment, the control unit 20 also generates acoustic instructions as output to be transmitted to the sound module 50, to play sounds. In an embodiment, the sound module 50 includes a plurality of speakers which are used to play the sounds. In the course of the present description the term “sounds” is used to refer to any emitted vibrations (or propagated soundwave) that can be heard and interpreted when reaching a person’s ear, such as, for example, individual noises, music, etc.

Once again, in an embodiment, the acoustic instructions relative to the sounds to be played by the sound module 50 result from processing of the surface interaction data generated using the motion sensing module 60, thereby producing an interactive auditive environment for the users. In other words, the acoustic instructions are generated based on the surface interaction data, which indicates that the acoustic instructions are dependent on the real-world events related to the real-world elements 15 contacting the interactive surface 14, thereby providing the interactivity between the real-world actions and the sounds played by the interactive game system 10.

In view of the above, in an embodiment, the control unit 20 synchronizes the graphic projected by the projection module 30, the illumination provided by the lighting module 40 and the sound played by the sound module 50, to provide an immersive experience where the graphics, the illumination and the sounds are complementary and coordinated to match the implementation of the gameplay of the interactive game, as the game progresses. As mentioned above, one skilled in the art will however understand that, in an embodiment, the interactive game system 10 could be free of sound module 50, with the immersive experience being rather provided by the combination of the graphics and the illumination being complementary and coordinated to match the implementation of the gameplay of the interactive game.

In an alternative embodiment, the sounds played by the sound module 50, according to the acoustic instructions, could also be independent from the surface interaction data generated using the motion sensing module 60, i.e. the acoustic instructions generated by the control unit 20 could be predetermined and be independent from the interaction of the real-world element 15 with the interactive surface 14. In such an embodiment, there is therefore no sync between the sound played by the sound module 50 and the graphic projected by the projection module 30 and/or the illumination provided by the lighting module 40, while still providing an immersive experience where sound, large scale graphics and illumination of the room are provided.

One skilled in the art will understand that the acoustic instructions could relate to the nature of the sounds to be played by the sound module 50 as well as to a specific acoustic direction in which the sounds are to be played, i.e. a direction of an acoustic beam for the sounds to be played by each one of the speakers 52 of the sound module 50.

Figure 3:
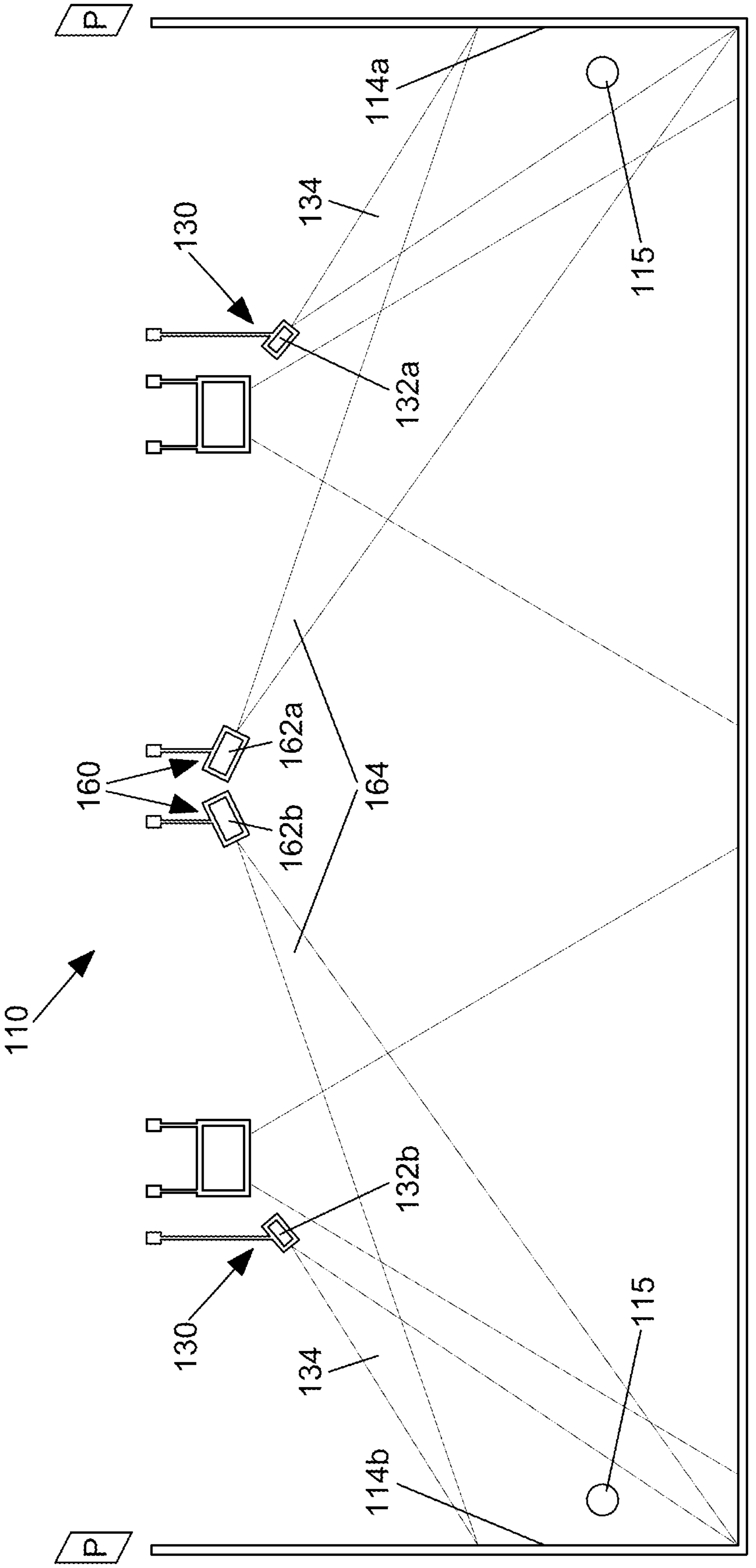
FIG. 3 is a schematic diagram of the interactive game system installed in a room of a building, in accordance with an embodiment where two interactive surfaces are provided.

In an alternative embodiment shown in FIG. 3 wherein the features are numbered with reference numerals in the 100 series which correspond to the reference numerals of the previous embodiments, the interactive game system 110 could include two interactive surfaces 114*a*, 114*b*. In such an embodiment, the two interactive surfaces 114*a*, 114*b* could be facing one another, but one skilled in the art will understand that they could also be at an angle relative to one another.

In such an embodiment, each one of the motion sensing module 160 and the projection module 130 are configured to have a respective motion sensor field of view 164 and a projector field of view 134, intersecting with each one of the interactive surfaces 114*a*, 114*b*, to generate surface interaction data representative of contact between the real-world elements 115 and the planes P defining the interactive surfaces 114*a*, 114*b*, and for projecting the graphics on each one of the interactive surfaces 114*a*, 114*b*. In other words, the motion sensing module 160 includes a first motion sensor 162*a* oriented towards a first interactive surface 114*a*, and a second motion sensor 162*b* oriented towards a second interactive surface 114*b* and the projection module 130 includes at least a first projector 132*a* oriented towards the first interactive surface 114*a* and at least a second projector 132*b* oriented towards the second interactive surface 114*b*. In an embodiment, the graphics projected on the interactive surfaces 114*a*, 114*b* are the same for each one of the interactive surfaces 114*a*, 114*b*. One skilled in the art will however understand that, in an alternative embodiment, the graphics projected on the interactive surfaces 114*a*, 114*b* could be different for each one of the interactive surfaces 114*a*, 114*b*. One skilled in the art will also understand that, in an alternative embodiment (not shown) more that two interactive surfaces 114*a*, 114*b* could be provided.

An interactive game system 10 in accordance with an embodiment having been described above, there will now be described a method for operation of such a system or, in other words, a method for providing an interactive game to users, using an interactive game system 10.

Figure 4:
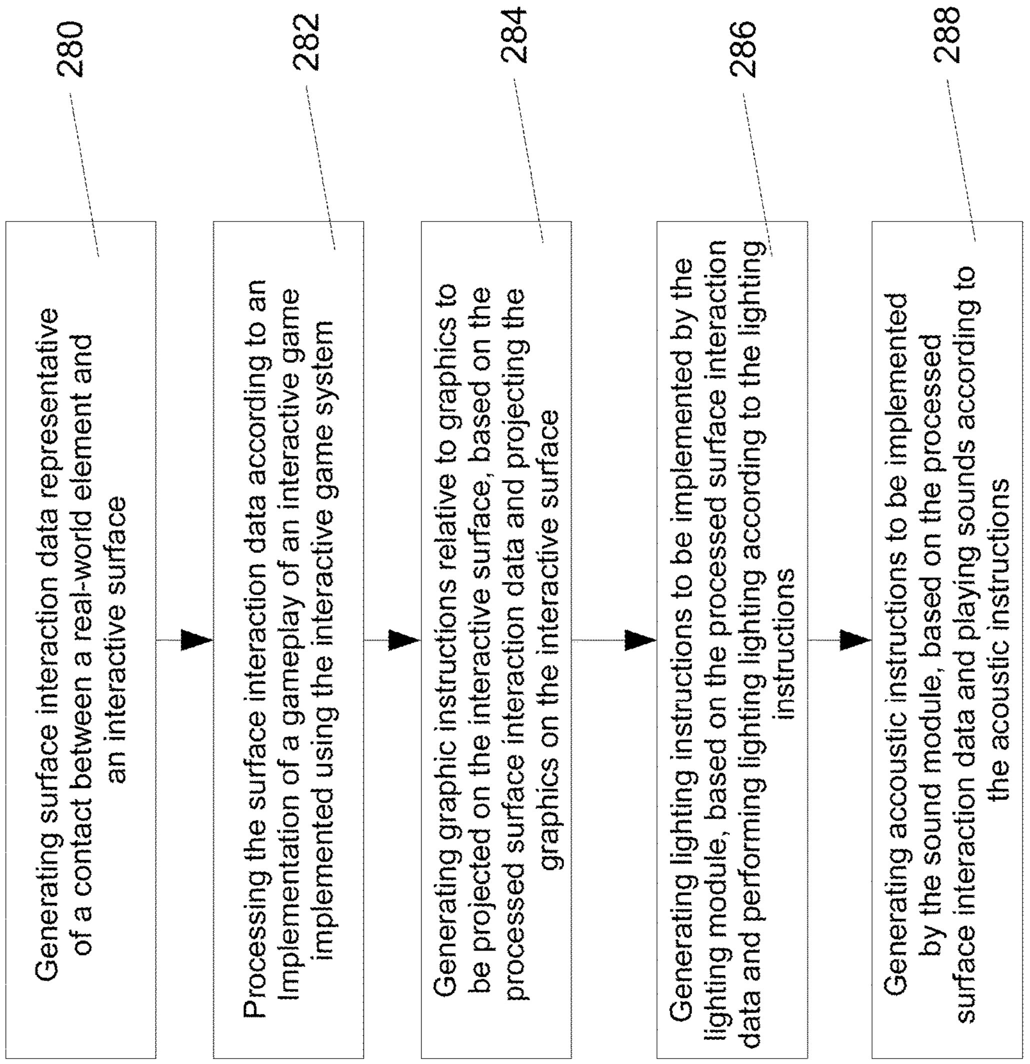
FIG. 4 is a flowchart, illustrating the steps of a method of operation of an interactive game system, in accordance with an embodiment.

With reference to FIG. 4, in an embodiment, the method includes the initial step 280 of generating surface interaction data representative of a contact between a real-world element and at least one interactive surface. In an embodiment, the surface interaction data can be generated by a motion sensing module and be communicated in real-time to a control unit in data communication therewith. In an alternative embodiment, the surface interaction data can be generated by the control unit, based on raw data relative to motion of a real-world element within the field of view of the motion sensing module and communicated to the control unit in real-time.

In view of the above, in an embodiment wherein the step of generating surface interaction data representative of a contact between a real-world element and at least one interactive surface includes sensing movement of the real-world element within a motion sensor field of view intersecting with the interactive surface.

As mentioned above, in an embodiment, each one of the at least one interactive surface is a large surface defined by at least a portion of a wall of a room in which the interactive game is provided. In an embodiment, each one of the at least one interactive surface is a plane surface defined by at least the portion of a wall of a room in which the interactive game is provided.

The method also includes the step 282 of processing (or interpreting) the surface interaction data according to a gameplay of an interactive game implemented using the interactive game system.

The method further includes the step 284 of generating graphic instructions to be projected on at least one interactive surface, based on the processed surface interaction data and according to the predetermined implementation of the gameplay of the interactive game. In other words, this step allows the display of graphics representing progress of the interactive game, in accordance with the predetermined implementation of the gameplay, in response to the detected contacts between the real-world element and the interactive surface. In an embodiment, the graphics are generated by a game engine of the control unit and are communicated in real-time to the projection module, for projection thereof on the at least one interactive surface.

In an embodiment, the method further includes the step 286 of generating lighting instructions based on the processed surface interaction data and according to the predetermined implementation of the gameplay of the interactive game and implementing the lighting instructions using the lighting module. In other words, this step allows generating lighting instructions and providing illumination of a section of the room, which is complementary to the graphics displaying progress of the interactive game, in accordance with the predetermined implementation of the gameplay, in response to the detected contact between the real-world element and the interactive surface. In an embodiment, the lighting instructions are generated by the game engine of the control unit and are communicated in real-time to the lighting module, such that the stage lighting instruments thereof can produce the desired illumination of the room (or specific section thereof).

In an embodiment, the step of generating and implementing the lighting includes projecting light according to an illumination span covering at least a portion of the room and which does not overlap with the interactive surface.

In an embodiment, the step of generating and implementing the lighting includes independently controlling each stage lighting instrument of the lighting module.

In an embodiment, the method further includes the step 288 of generating acoustic instructions based on the processed surface interaction data and according to the predetermined implementation of the gameplay of the interactive game and implementing the acoustic instructions using the sound module. In other words, this step allows generating acoustic instructions and playing sounds complementary to the graphics and/or illumination representing progress in the interactive game, in accordance with the predetermined implementation of the gameplay, in response to the detected contact between the real-world element and the interactive surface. In an embodiment, the acoustic instructions are generated by the game engine of the control unit and are communicated in real-time to the sound module, such that the speakers thereof can play the sounds in the room (or in a specific acoustic direction in the room).

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. An interactive game system for implementing an interactive game in a room of a building, the room having a projection wall and a floor, the interactive game system comprising:
- a motion sensing module positioned spaced-apart from the projection wall and having a motion sensor field of view directed towards the projection wall and intersecting with the projection wall to define an interactive surface on the projection wall, the motion sensing module sensing contact between a real world element and the projection wall, within the interactive surface and generating surface interaction data representative of the contact between the real-world element and the interactive surface;
- a control unit in data communication with the motion sensing module, the control unit being configured to process the surface interaction data and generate graphic instructions and lighting instructions, in accordance with an implementation of a gameplay of the interactive game;
- a projection module in data communication with the control unit and receiving the graphic instructions therefrom, the graphic instructions being generated based on the processed surface interaction data, the projection module projecting graphics on the interactive surface according to the graphic instructions received from the control unit; and
- a lighting module in data communication with the control unit and receiving the lighting instructions therefrom, the lighting module generating a light beam at least directed to the floor, the illumination being performed according to the lighting instructions received from the control unit.

2. The interactive game system of claim 1, wherein the lighting instructions are generated based on the surface interaction data, the graphics projected by the projection module and the lighting performed by the lighting module being coordinated in accordance with the implementation of the gameplay of the interactive game.

3. The interactive game system of claim 1, further comprising a sound module in data communication with the control unit and receiving acoustic instructions therefrom, the sound module playing sounds according to the acoustic instructions received from the control unit.

4. The interactive game system of claim 3, wherein the acoustic instructions are generated based on the surface interaction data, the sounds played by the sound module and the graphics projected by the projection module being coordinated in accordance with the implementation of the gameplay of the interactive game.

5. The interactive game system of claim 1, wherein the lighting module comprises a plurality of stage lighting instruments operating independently to illuminate a desired section of the room.

6. The interactive game system of claim 5, wherein the lighting module comprises a DMX controller and wherein the lighting module controls the plurality of stage lighting instruments using a DMX lighting control protocol.

7. The interactive game system of claim 5, wherein the plurality of stage lighting instruments includes a combination of moving light fixtures and static light fixtures.

8. The interactive game system of claim 1, wherein the control unit comprises a memory and a processor, the control unit having a game engine stored in a memory and configured to implement a predetermined gameplay, based on user interactions defined by the surface interaction data, the game engine generating the graphic instructions and the lighting instructions.

9. A method for providing an interactive game in a room of a building, using an interactive game system, the method comprising the steps of:
- monitoring contact between a real world element and an interactive surface defined along at least a portion of a wall of the room of the building using a motion sensing module positioned spaced-apart from the wall;
- generating surface interaction data representative of the contact between a real world element and the interactive surface;
- processing the surface interaction data in accordance with an implementation of a gameplay of the interactive game implemented using the interactive game system;
- generating graphic instructions relative to graphics to be projected on the interactive surface, based on the processed surface interaction data, and projecting the graphics on the interactive surface according to the graphic instructions; and generating lighting instructions based on the processed surface interaction data and performing lighting of a section of the room according to the lighting instructions, simultaneously with the projection of the graphics on the interactive surface, and including generating a light beam at least directed to the floor.

10. The method of claim 9, further comprising generating acoustic instructions based on the processed surface interaction data and playing sounds according to the acoustic instructions.

11. The method of claim 9, wherein the step of generating lighting instructions and performing the lighting includes projecting light according to an illumination span covering at least a portion of the room distinct from the interactive surface.

12. The method of claim 9, wherein the step of generating lighting instructions and performing the lighting includes independently controlling each stage lighting instrument of the lighting module in accordance with the lighting instructions.

13. The method of claim 9, wherein the step of generating surface interaction data representative of the contact between the real-world element and the interactive surface includes sensing movement of the real-world object within a motion sensor field of view intersecting with the interactive surface.

14. The method of claim 9, wherein the generated light beam is substantially non-overlapping with the interactive surface.

15. The interactive game system of claim 1, wherein the motion sensing module comprises a camera, an infrared emitter, and an infrared depth sensor cooperating to sense contact between the real-world element and the projection wall within the interactive surface.

16. The interactive game system of claim 1, wherein the lighting module comprises a plurality of stage lighting instruments configured to illuminate a section of the floor of the room.

17. The interactive game system of claim 1, wherein the motion sensing module comprises a three-dimensional (3D) motion sensor configured to sense contact between the real-world and the projection wall within the interactive surface.

18. The interactive game system of claim 1, wherein the lighting module comprises a plurality of lighting instruments together defining an illumination span substantially oriented towards the floor.

19. The interactive game system of claim 1, wherein the light beam generated by the lighting module is substantially non-overlapping with the interactive surface.

* * * * *